(12) United States Patent
Dhoble et al.

(10) Patent No.: US 12,443,707 B2
(45) Date of Patent: Oct. 14, 2025

(54) TRUST-BASED WORKSPACE INSTANTIATION

(71) Applicant: Dell Products L.P., Round Rock, TX (US)

(72) Inventors: Girish S. Dhoble, Austin, TX (US); Nicholas D. Grobelny, Evergreen, CO (US); David Konetski, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 244 days.

(21) Appl. No.: 17/870,912

(22) Filed: Jul. 22, 2022

(65) Prior Publication Data

US 2024/0028713 A1 Jan. 25, 2024

(51) Int. Cl.
*G06F 21/00* (2013.01)
*G06F 21/55* (2013.01)
*G06F 21/56* (2013.01)

(52) U.S. Cl.
CPC .......... *G06F 21/554* (2013.01); *G06F 21/552* (2013.01); *G06F 21/568* (2013.01)

(58) Field of Classification Search
CPC ..... G06F 21/554; G06F 21/552; G06F 21/568
See application file for complete search history.

(56) References Cited

U.S. PATENT DOCUMENTS

| | | | | |
|---|---|---|---|---|
| 5,581,691 A * | 12/1996 | Hsu | ........................ | G06F 9/466 714/45 |
| 10,075,459 B1 * | 9/2018 | Suryanarayanan | ......................... | H04L 63/1416 |
| 10,855,619 B1 * | 12/2020 | Andrews | .................. | H04L 63/20 |
| 2011/0184897 A1 * | 7/2011 | Howard | .................... | G06N 5/02 706/13 |
| 2019/0265989 A1 * | 8/2019 | Mohamed Haneefa | ...................... | G06F 18/24 |
| 2021/0123329 A1 | 4/2021 | Coffey et al. | | |
| 2022/0004623 A1 * | 1/2022 | Trabelsi | ................ | H04L 63/029 |
| 2022/0124131 A1 * | 4/2022 | Chanda | ................ | G06Q 10/101 |
| 2022/0321615 A1 * | 10/2022 | Qabazard | .............. | H04L 67/535 |
| 2023/0177056 A1 * | 6/2023 | Hamdi | .................... | G06F 16/25 707/722 |

(Continued)

OTHER PUBLICATIONS

Goodall et al., "(Situ: Identifying and Explaining Suspicious Behavior in Networks", IEEE Transactions on Visualization and Computer Graphics, vol. 25, No. 1, Jan. 2019.*

*Primary Examiner* — Morshed Mehedi
(74) *Attorney, Agent, or Firm* — Larson Newman, LLP (57) ABSTRACT

Workspace instantiations are monitored for potentially suspicious behavior. A client endpoint computer creates and maintains a log of historical events associated with a workspace instantiation. Each time the client endpoint computer processes an event associated with the workspace instantiation, the client endpoint computer adds and timestamps a new entry in the log of the historical events associated with the workspace instantiation. The log of the historical events thus represents a rich database description of the workspace instantiation, its corresponding workspace definition file, its corresponding workspace lifecycle events, and their corresponding timestamps. A workspace orchestration service (perhaps provided by a server) may monitor the log of historical events and flag or alert of any entries indicating suspicious behavior. Any current workspace instantiation may thus be terminated as a security precaution.

20 Claims, 9 Drawing Sheets

(56) References Cited

U.S. PATENT DOCUMENTS

2023/0333713 A1* 10/2023 Chanda ................ G06F 3/0482

* cited by examiner

TRUST-BASED WORKSPACE INSTANTIATION

CROSS-REFERENCE TO RELATED APPLICATION

This patent application relates to U.S. patent application Ser. No. 16/670,658 filed Oct. 31, 2019, since published as U.S. Patent Application Publication 2021/0133298, and incorporated herein by reference in its entirety.

FIELD OF THE DISCLOSURE

This disclosure generally relates to information handling systems, and more particularly relates to detection of compromised workspace instances.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

Workspace instantiations are monitored for potentially suspicious behavior. Each time a client endpoint computer instantiates a workspace, the client computer creates a new log of events associated with the workspace instantiation. Each time the client endpoint computer processes an event associated with the workspace instantiation, the client endpoint computer adds and timestamps a new entry in the log of the events associated with the workspace instantiation. The log of the events thus represents a rich database description of each workspace, its corresponding workspace definition file, its corresponding workspace lifecycle events, and their corresponding timestamps. A workspace orchestration service (perhaps provided by a server) may collect and monitor the logs of historical workspace instantiation events and compare to trusted events. The workspace orchestration service may then flag or alert of any entries indicating suspicious behavior. Any current workspace instantiation may thus be terminated as a security precaution.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
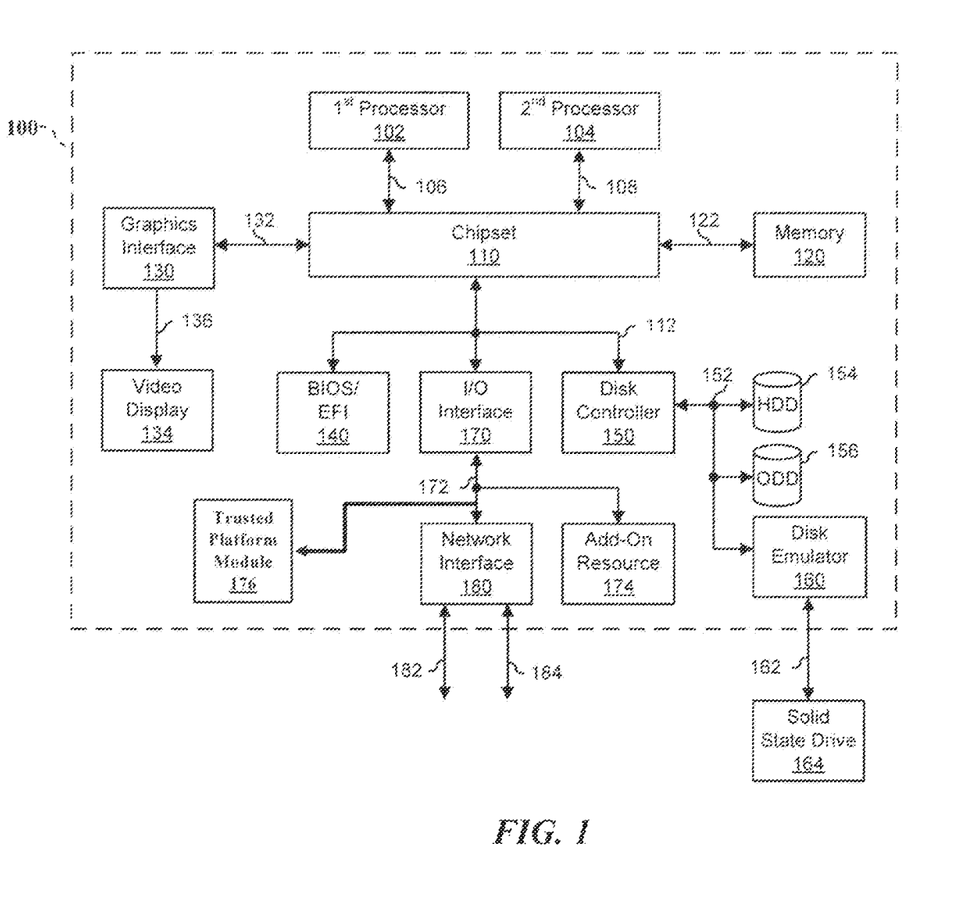
FIG. 1 illustrates an information handling system incorporating an intelligent imaging device, according to exemplary embodiments.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, and a network interface device 180. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM)

DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface device 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a sound card, data storage system, an additional graphics interface, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel is of a different type than peripheral channel 172 and network interface device 180 translates information from a format suitable to the peripheral channel to a format suitable to external devices. In a particular embodiment, network interface device 180 includes a host bus adapter (HBA), a host channel adapter, a network interface card (NIC), or other hardware circuit that can connect the information handling system to a network. An example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface that may include an inter-integrated circuit ($I^2C$) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

Because the information handling system 100 may operate in an enterprise networking environment, corruption and security threats are a concern. A data center, for example, may have hundreds or even thousands of different information handling systems, such as servers, switches, routers, and data storage equipment. All these information handling systems process vast amounts of sensitive/proprietary electronic data. Conventional data security schemes would merely isolate an entire network to prevent security threats. However computer users need data access from home, coffee shops, hotels, and other remote locations. Today's users, in other words, must access electronic data using public and untrusted networks. Moreover, today's users may also access electronic data using many different enterprise machines, many different personal devices, and many different software applications. Simply put, electronic data must be protected, even though accessed by a great variety of machines, software, and networks.

A common use case for a modern workspace is where workspace instances are deployed across multiple devices in an organization. Workspace instantiation on a client endpoint might fail due to corruption or a security attack. When an attacker compromises one instance of a workspace, it is desirable to identify that instance before the infection spreads from one system to another in the network or even compromises the device itself.

Figure 2:
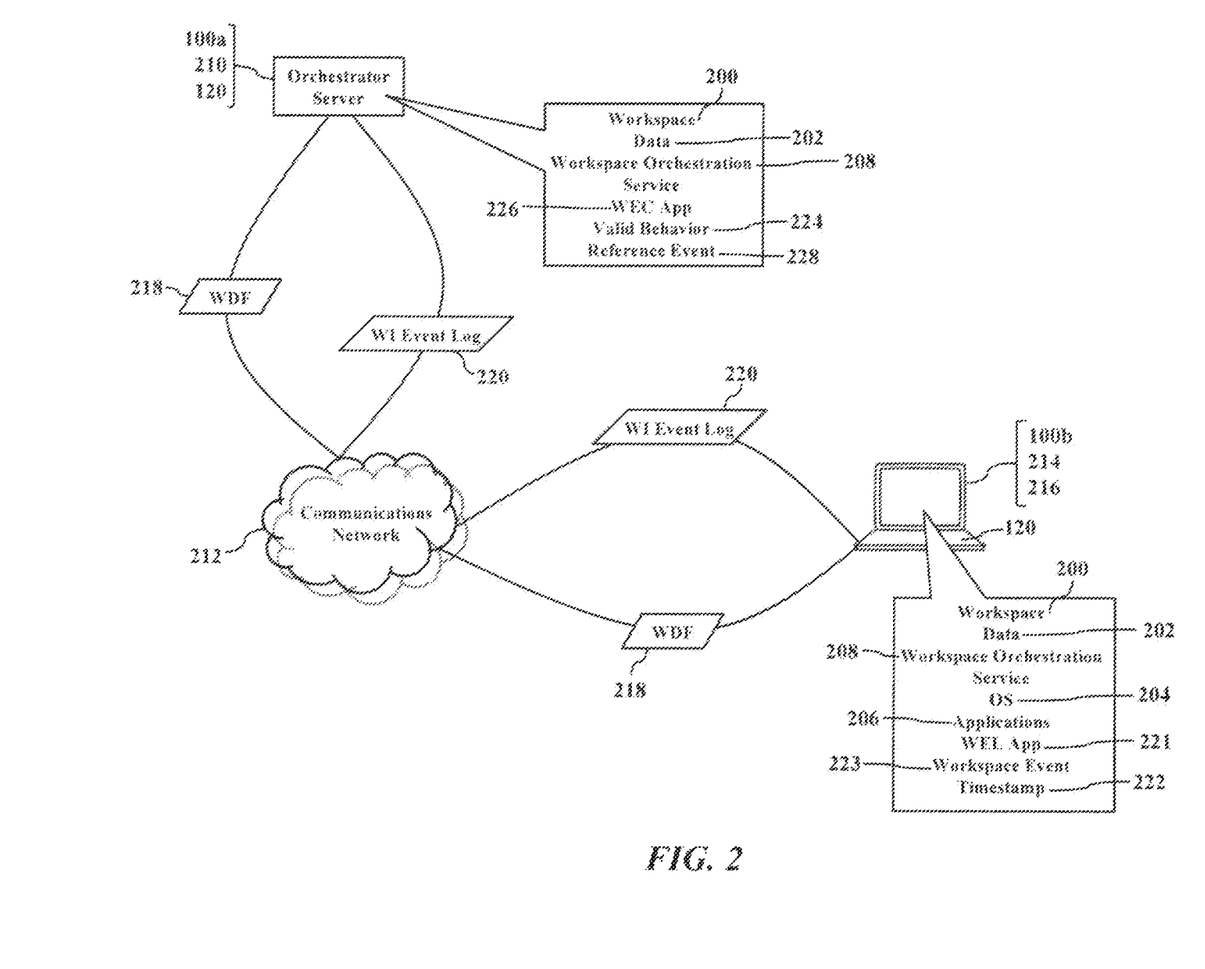
FIGS. 2-3 are simplified illustrations of detecting a compromised computer workspace instantiation, according to exemplary embodiments.
Figure 3:
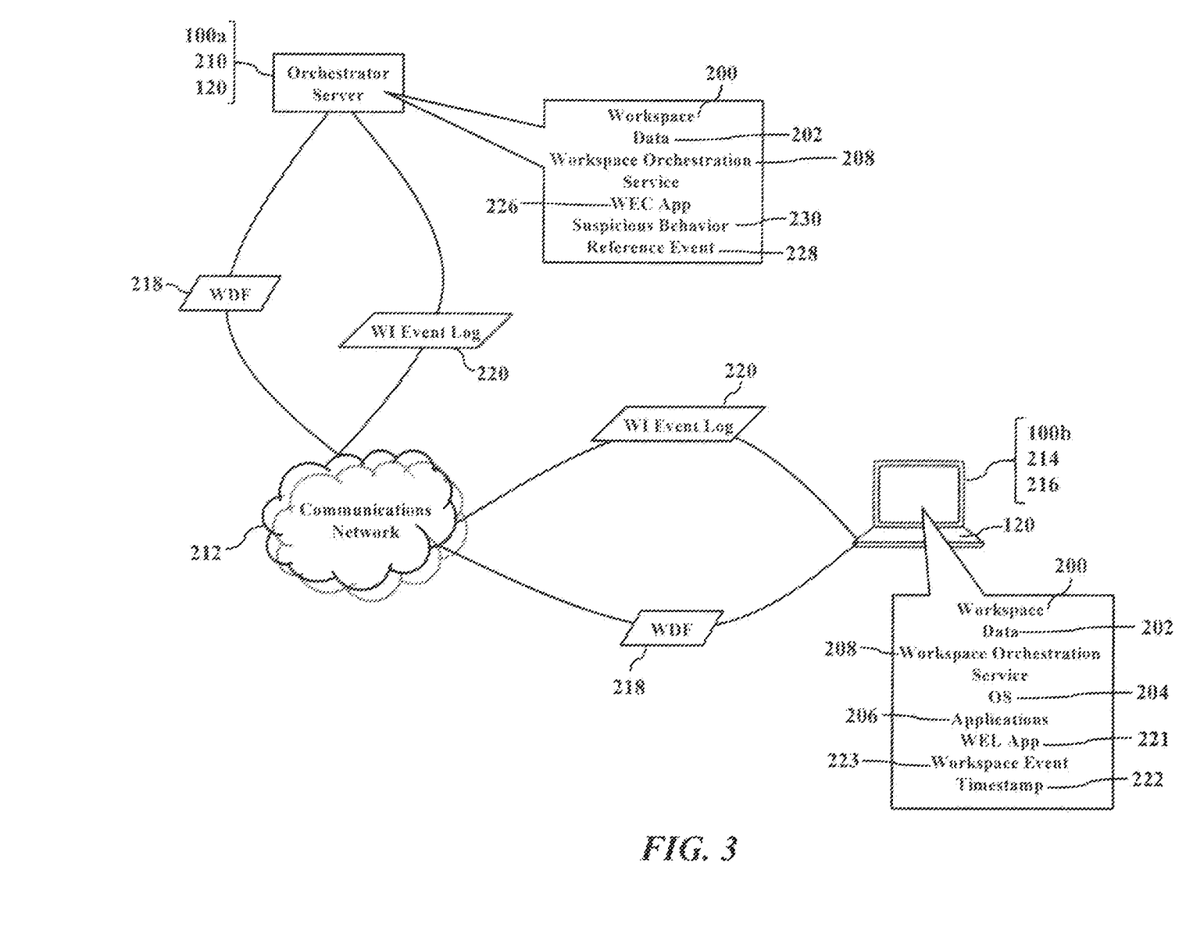

FIGS. 2-3 are simplified illustrations of detecting a compromised computer workspace instantiation, according to exemplary embodiments. One or more of the information handling systems 100 may be configured for securing a dynamic workspace 200 in an enterprise productivity ecosystem. The information handling systems 100 cooperate to instantiate, manage, and/or terminate the workspace 200. The workspace 200 is a digital or virtual secure environment that provides access to sensitive/proprietary/enterprise electronic data 202. The workspace 200, however, also isolates the sensitive/proprietary/enterprise electronic data 202 from an operating system (illustrated as "OS") 204 and other software applications 206.

FIG. 2 thus illustrates a workspace orchestration service 208. An orchestrator server 210 communicates via a communications network 212 with an endpoint computer 214. The orchestrator server 210 is a server-version of the information handling system (illustrated as reference numeral 100a). The endpoint computer 214 is illustrated as a mobile or laptop computer 216, which most readers understand as another version of the information handling system (illustrated as reference numeral 100b). The orchestrator server 210 provides the workspace orchestration service 208 to the endpoint computer 214. That is, the orchestrator server 210 and the endpoint computer 214 cooperate, perhaps in a client/server relationship, to initialize the dynamic workspace 200, to orchestrate the dynamic workspace 200, and to terminate the dynamic workspace 200. The dynamic workspace 200 is defined according to a workspace definition file (illustrated as "WDF") 218. The workspace definition file 218 is generated by the orchestrator server 210 providing the workspace orchestration service 208. The orchestrator server 210 sends the workspace definition file 218 via the communications network 212 to the endpoint computer 214. When the endpoint computer 214 receives the workspace definition file 218, the endpoint computer 214 cooperates with the orchestrator server 210 to orchestrate the dynamic workspace 200, as specified by the workspace definition file 218. There are many complicated concepts, components, and factors that are related to the workspace orchestration service 208, which this disclosure will later explain.

The workspace 200 may be compromised. The instantiation of the workspace 200 at the client endpoint computer 214 might fail, perhaps due to software/data corruption or a security attack. When an attacker compromises one instance of the workspace 200, the inventors have conceived elegant schemes to identify that compromised instance of the workspace 200 before the infection spreads from the endpoint computer 214 to another client system or even compromises the endpoint computer 214 itself.

Exemplary embodiments detect and isolate a compromised workspace instantiation in an automated and timely manner. As FIG. 2 illustrates, the endpoint computer 214 generates and maintains workspace instantiation event logs (illustrated as "WI Event Log") 220. The workspace instantiation event log 220 is generated by a workspace event logging software application ("WEL App") 221 stored in the memory device 120 of the endpoint computer 214. When the endpoint computer 214 executes the workspace event logging software application 221, the workspace event logging software application 221 includes programming statements or instructions that cause the endpoint computer 214 to perform operations, such as monitoring and logging workspace events 223 associated with the workspace 200 and/or the workspace definition file 218. Each workspace instantiation event log 220 thus represents a historical record of a single workspace instantiation attempted, and/or requested, by the endpoint computer 214.

That is, each time the endpoint computer 214 processes any workspace event 223 associated with the workspace 200, the endpoint computer 214 adds an entry to the workspace instantiation event log 220. As one example, each time the endpoint computer 214 attempts or requests to instantiate the workspace 200 (such as identified by the workspace definition file 218), the endpoint computer 214 creates a new workspace instantiation event log 220. As another example, an entry may be added to the workspace instantiation event log 220 each time the workspace definition file 218 is received from the orchestrator server 210 providing the workspace orchestration service 208. As another example, an entry may be added to the workspace instantiation event log 220 each time an instantiations operation described within the workspace definition file 218 is executed by the endpoint computer 214. The client endpoint computer 214 may add other entries describing other workspace lifecycle events 223, such as workspace instantiation time, timestamp and sequence of instantiation operations, instantiation count, initial memory and network signature, and/or any delay between instantiation operations.

Moreover, as the endpoint computer 214 logs any workspace event 223, the endpoint computer 214 may also determine and log an instantiation event timestamp 222. The workspace instantiation event log 220 thus has entries that map or relate the workspace 200 (such as the workspace definition file 218) to the workspace event 223 and to the instantiation event timestamps 222 marking each workspace instantiation request, receipt, and/or execution. As the endpoint computer 214 initiates and instantiates the workspace 200 (and its corresponding workspace definition file 218), the workspace instantiation event log 220 logs a rich database repository of the workspace 200, the corresponding workspace definition file 218 (such as a unique filename or other identifier), a chronological or sequential listing of the corresponding workspace events 223, and their corresponding instantiation event timestamps 222.

The workspace orchestration service 208 may thus identify valid behavior 224. Exemplary embodiments may inspect the workspace instantiation event log 220 and determine when the workspace 200, and/or the endpoint computer 214, is/are behaving or operating as normally expected. The endpoint computer 214, for example, may send the entire workspace instantiation event log 220, or any portion or part of its entries, to the IP address associated with the orchestrator server 210. When the orchestrator server 210 receives the entries representing some or all of the workspace instantiation event log(s) 220, the orchestrator server 210 may inspect the entries for the valid behavior 224. The orchestrator server 210 may store a workspace event comparator software application (or "WEC App") 226 in its memory device 120.

When the orchestrator server 210 executes the workspace event comparator software application 226, the workspace event comparator software application 226 includes programming statements or instructions that cause the orchestrator server 210 to perform operations, such as comparing the log entries to baseline or reference events 228. The baseline or reference events 228 may be those individual workspace events, or perhaps one or more reference logs, describing golden or acceptable performance behaviors. The baseline or reference events 228 represent normal or as-expected workspace events 223 and timing associated with the workspace 200. If the log entries representing the workspace instantiation event log 220 satisfactorily match (such as within a delta range of values, events, and/or timing) the baseline or reference events 228, then the workspace 200, and/or the endpoint computer 214, is/are behaving or operating as expected and inferred to be the valid behavior 224. The orchestrator server 210 may thus continue providing the workspace orchestration service 208.

FIG. 3, though, illustrates suspicious behavior 230, according to exemplary embodiments. The workspace event comparator software application 226 instructs or causes the orchestrator server 210 to compare the log entries of the workspace instantiation event log 220 to the baseline or reference events 228. The orchestrator server 210, in other words, may assume the burden of detecting the suspicious behavior 230. Again, the baseline or reference events 228 represent normal or as-expected workspace events 223 and timing associated with the workspace 200. If, however, the log entries fail to satisfactorily match the baseline or reference events 228 (as above explained), then the workspace 200, and/or the endpoint computer 214, is/are abnormally behaving or operating and inferred to be the suspicious behavior 230. Once the suspicious behavior 230 is inferred, remedial measures are implemented. The workspace event comparator software application 226, for example, may prohibit the orchestrator server 210 from proceeding to or with orchestration. The orchestrator server 210, in other words, may halt or terminate the instantiation and/or orchestration of the current workspace 200 and/or its corresponding workspace instantiation file 218. The orchestrator server 210 may decline to send the workspace instantiation file 218 to the endpoint computer 214, if not already sent. The orchestrator server 210 may terminate workspace orchestration service 208.

The baseline or reference events 228 may thus represent so-called golden measurements. Because the orchestrator server 210 may provide the workspace orchestration service 208 to many endpoint client devices/computers (such as in an enterprise networking environment), the orchestrator server 210 may maintain or access a collection of different baseline or reference events 228, perhaps according to each different WDF 218 and/or the particular platform hardware represented by the endpoint computer 214. In other words, exemplary embodiments may generate the baseline or reference events 228 according to field/network observations associated with similar hardware-inventoried machines running/executing the same or similar WDF 218. Every client endpoint platform may thus have a different set of measurements (for example, a workspace instantiation time may be shorter/less in a high-end precision desktop, whereas a consumer laptop likely requires a greater workspace instantiation time). The remote orchestrator server 210 may create and maintain these golden measurements, or the workspace orchestration service 208 may store/access these golden measurements from any networked resource.

Figure 4:
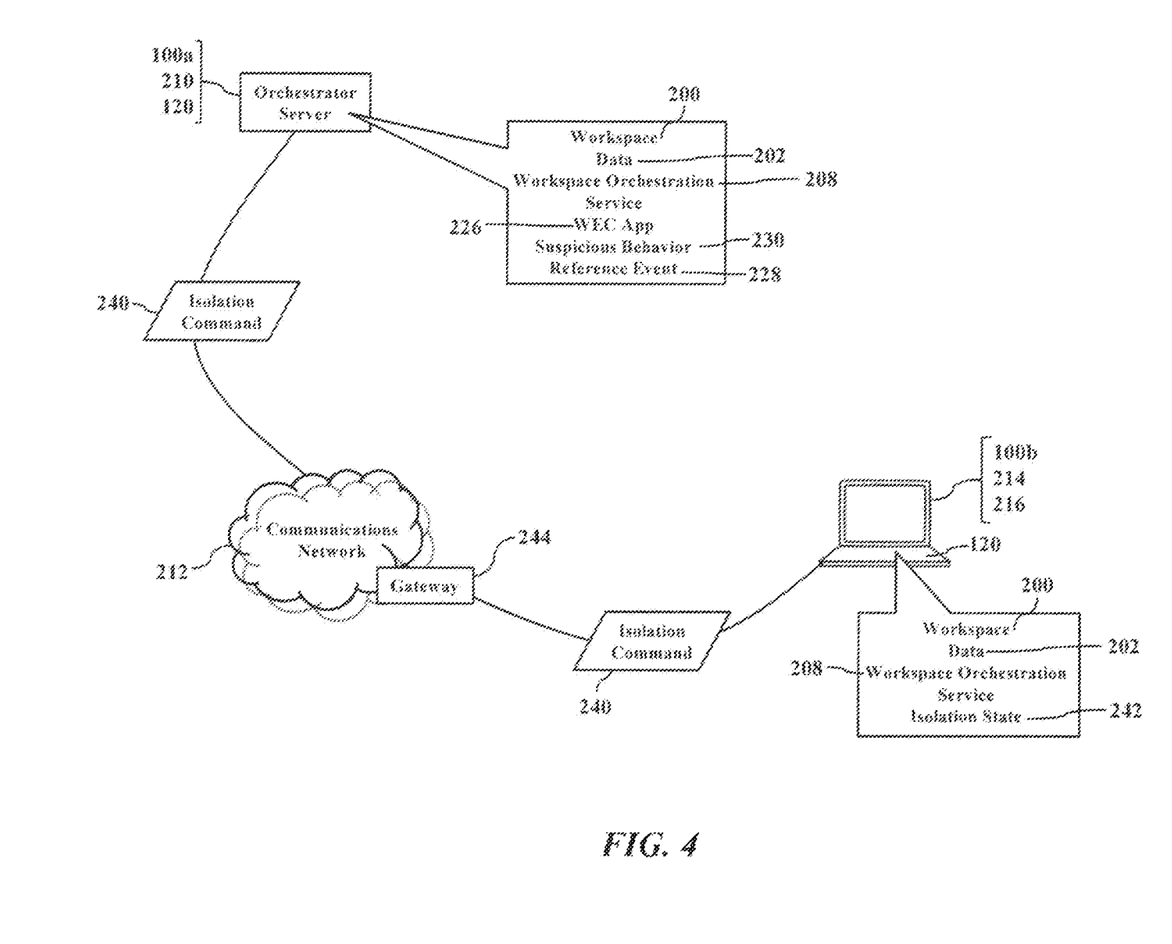
FIG. 4 illustrates behavioral isolation, according to exemplary embodiments.

FIG. 4 illustrates behavioral isolation, according to exemplary embodiments. When the suspicious behavior 230 is inferred, the orchestrator server 210 may isolate the endpoint computer 214, as a further security precaution. The workspace event comparator software application 226, for example, may instruct or cause the orchestrator server 210 to send one or more isolation commands 240. The isolation commands 240 communicatively sever the endpoint computer 214 from the communications network 212. The isolation command 240, for example, may be sent to the IP address associated with the endpoint computer 214. The isolation command 240 causes the endpoint computer 214 to enter an isolation state 242 that disables any or all of the network interfaces 180 (illustrated in FIG. 1). The isolation command 240 may additionally or alternatively be sent to the IP address associated with a switch/modem/gateway 244 that interfaces between the endpoint computer 214 and the communications network 212. The isolation command 240 instructs or causes the switch/modem/gateway 244 to disable or shutdown a port serving, or assigned to, or associated with the endpoint computer 214. Now that the endpoint computer 214 is isolated, further root-causing and analysis may be safely performed.

Figure 5:
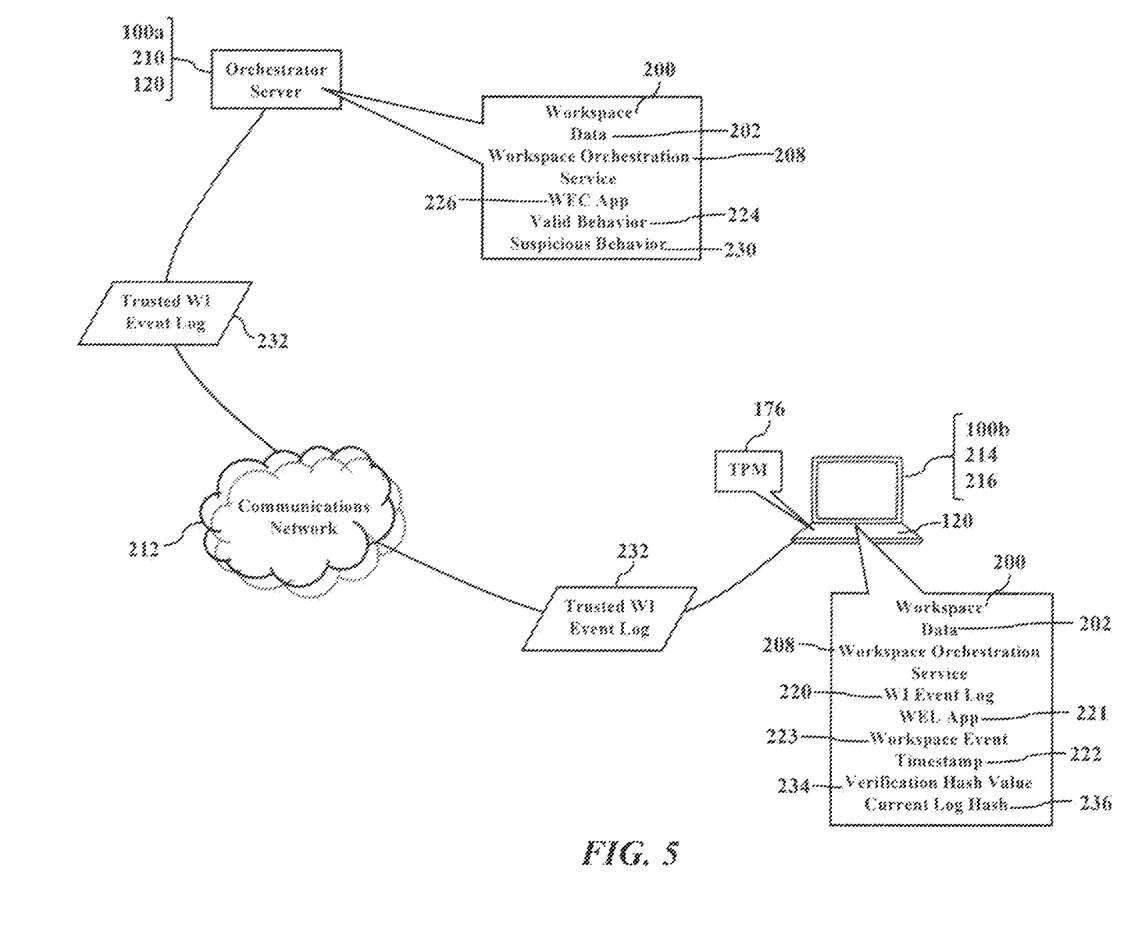
FIG. 5 illustrates trusted logging, according to exemplary embodiments.

FIG. 5 illustrates trusted logging, according to exemplary embodiments. Even though the workspace instantiation event log 220 may be a rich source of the workspace instantiation events 223, the inventors are concerned that the workspace instantiation event log 220 could be hacked and compromised. For example, an attacker may gain access to user accounts that have high local privileges. It is possible, then, that the attacker may gain access to the workspace instantiation event log 220 and tamper/modify/change its entries. This scenario may thus erode the ability of the remote orchestrator server 210 to trust the local workspace instantiation event log 220 sent by the endpoint computer 214. FIG. 5 thus illustrates a trusted workspace instantiation event log (or "trusted WI event log") 232. The trusted workspace instantiation event log 232 may be generated by the trusted platform module ("TPM") 176. The workspace event logging software application 221, for example, may cause the endpoint computer 214 to send or transfer the workspace instantiation event log 220 to the trusted platform module 176.

When the trusted platform module 176 receives the workspace instantiation event log 220, the trusted platform module 176 accepts the workspace instantiation event log 220 as an input and generates the trusted workspace instantiation event log 232 as an output. The trusted platform module 176 verifies that the electronic data or entries representing the trusted workspace instantiation event log 232 have not been changed, modified, or tampered with. The workspace event logging software application 221 may then instruct the endpoint computer 214 to send the trusted workspace instantiation event log 232 to the IP address associated with the orchestrator server 210. When the orchestrator server 210 receives the entries representing some or all of the trusted workspace instantiation event log 232, the orchestrator server 210 may inspect the entries for the valid behavior 224 and/or the suspicious behavior 230. The trusted platform module 176 thus provides integrity protection for the local agent's logs. The remote orchestrator server 210 verifies the integrity of the TPM-attested log and accepts only if the logs are verified.

A simple example helps explain verification. The trusted platform module 176 may use cryptographic hashing. When the trusted platform module 176 generates the trusted workspace instantiation event log 232, the trusted platform module 176 may generate a cryptographic verification hash value 234 that represents the workspace instantiation event log 220. The verification hash value 234 is generated by hashing the workspace instantiation event log 220 using a hashing algorithm. The trusted workspace instantiation event log 232 may then incorporate the verification hash value 234. When the orchestrator server 210 receives the trusted workspace instantiation event log 232, the orchestrator server 210 may recheck hash values to verify authenticity/integrity. The workspace event comparator software application 226, for example, may calculate a current hash value 236 by hashing the workspace instantiation event log 220 using the hashing algorithm. If the current hash value 236 matches the verification hash value 234 incorporated with the trusted workspace instantiation event log 232, then the workspace event comparator software application 226 may infer or determine that the workspace instantiation event log 220 can be trusted and relied upon for analysis. No attacker, in other words, has tampered with or modified the workspace instantiation event log 220. Should, however, the current hash value 236 fail to match the verification hash value 234, then the workspace instantiation event log 220 is untrusted and relied upon for analysis.

Exemplary embodiments may use any encryption or hashing function. There are many encryption algorithms and schemes, and the trusted platform module 176 may be adapted to execute or to conform to any encryption algorithm and/or scheme. Many readers may be familiar with the various hashing algorithms, especially the well-known SHA-256 hashing algorithm. The SHA-256 hashing algorithm acts on any electronic data or information to generate a 256-bit hash value as a cryptographic key. The key is thus a unique digital signature. However, there are many different hashing algorithms, and exemplary embodiments may be adapted to execute or to conform to any hashing algorithm, hashing family, and/or hashing scheme (for example Blake family, MD family, RIPE family, SHA family, CRC family).

Figure 6:
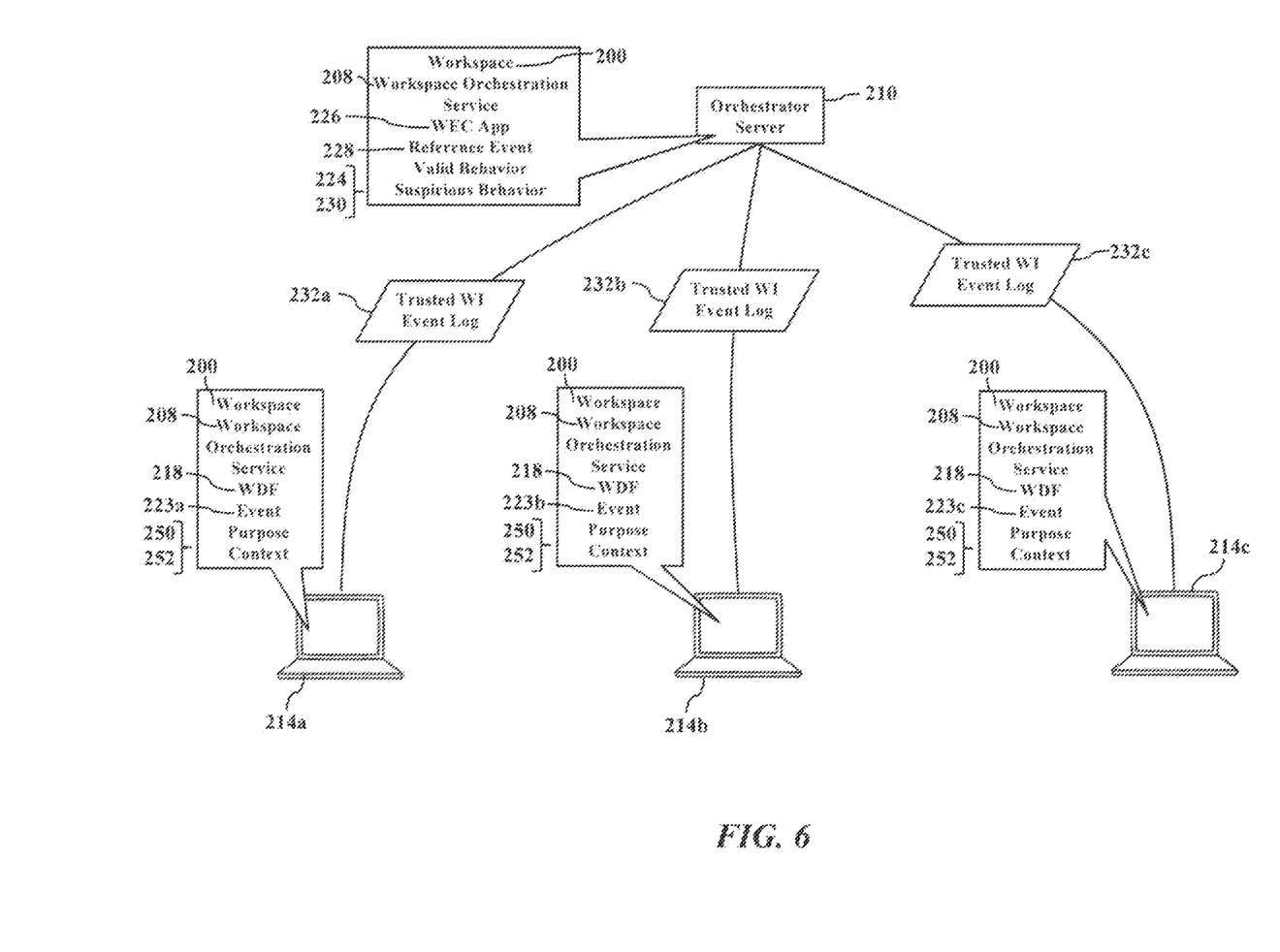
FIG. 6 illustrates network logging and monitoring, according to exemplary embodiments.

FIG. 6 illustrates network logging and monitoring, according to exemplary embodiments. Here the orchestrator server 210 may monitor multiple trusted workspace instantiation event logs 232 sent by many endpoint computers 214. As the reader may realize, there may be many human users using many different endpoint computers 214, especially in an enterprise networking environment. The users have different workspaces 200, depending on their individual purpose 250 and context 252. While there may be hundreds of different users and their respective endpoint computers 214 in an enterprise networking environment, so many endpoint computers 214 are too difficult to illustrate. FIG. 6 thus simply illustrates three (3) endpoint computers 214*a-c*. Each endpoint computer 214*a-c* cooperates with the orchestrator server 210 to instantiate the dynamic workspace 200, according to the workspace definition file 218, perhaps based on its corresponding purpose 250 and context 252. Each endpoint computer 214*a-c* generates and stores its corresponding trusted workspace instantiation event logs 232*a-c*. Each endpoint computer 214*a-c* sends its respective trusted workspace instantiation event logs 232*a-c* to the orchestrator server 210. The orchestrator server 210 may inspect each trusted workspace instantiation event logs 232*a-c* to identify the valid behavior 224 and/or the suspicious behavior 230.

Exemplary embodiments thus present an elegant computer security solution. Exemplary embodiments add an entry to the trusted workspace instantiation event log 232*a-c* each time the corresponding endpoint computer 214*a-c* instantiates any workspace event 223*a-c* associated with the dynamic workspace 200. Each endpoint computer 214*a-c* may forward its corresponding trusted workspace instantiation event log 232*a-c* to describe the workspace event 223*a-c* and date/time associated with the workspace definition file 218. The orchestrator server 210 may thus maintain a remotely-located, electronic backup copy of each trusted workspace instantiation event log 232*a-c* sent by the endpoint computers 214*a-c*. The orchestrator server 210 compares the trusted workspace instantiation event logs 232*a-c* to the baseline or reference events 228 associated with the WDF 218 and/or the particular platform hardware. If the suspicious behavior 230 is observed, the corresponding endpoint computer 214*a-c* may be automatically isolated (as explained with reference to FIG. 4) for further root-cause analysis.

Exemplary embodiments thus improve computer functioning. Exemplary embodiments detect any security attacks when all other indicators of attack fail to detect anomalous workspace instantiation behavior. Exemplary embodiments detect a compromised or corrupt workspace instance based on the unusual or irregular workspace events 223 logged during the workspace lifecycle. Workspace orchestration has the unique ability to maintain metadata to track and establish patterns across multiple iterations of passing workspace instantiation event logs, which non-orchestrated workspaces cannot accomplish alone.

Figure 7:
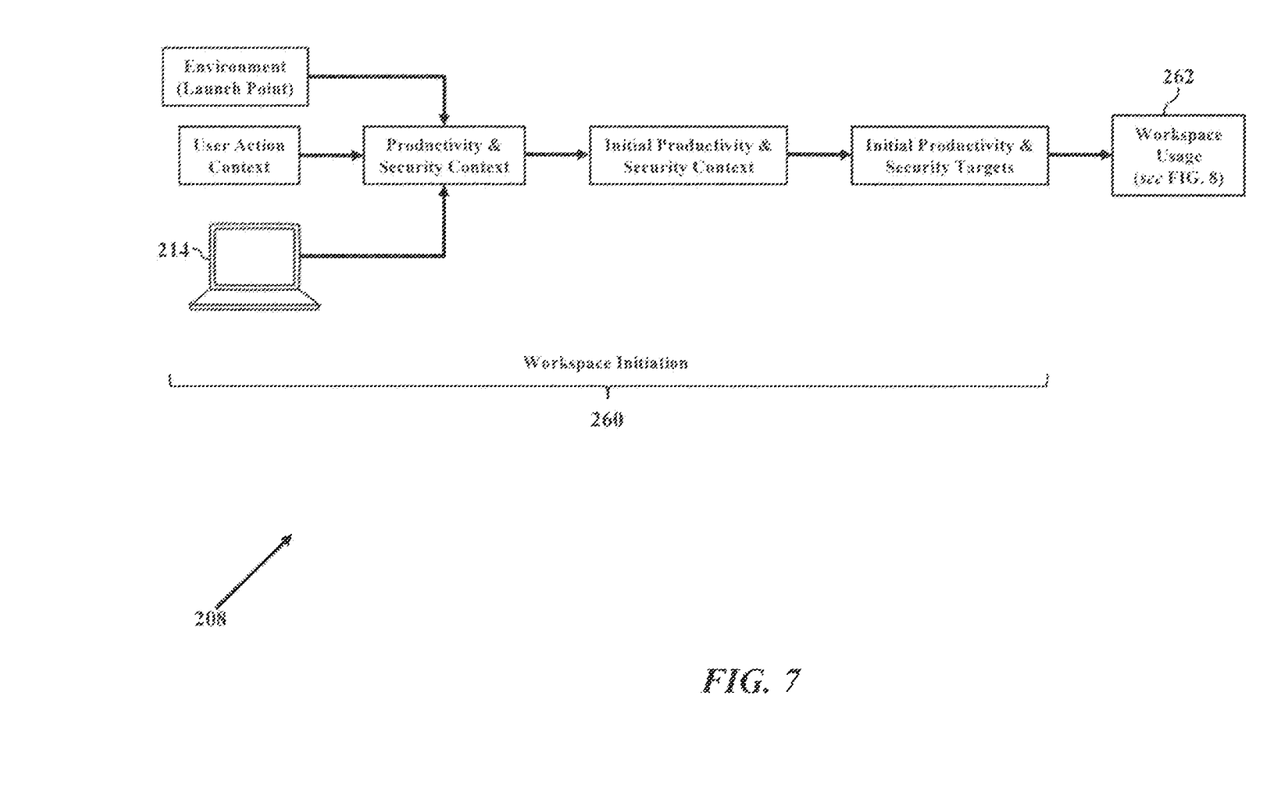
FIGS. 7-9 illustrate a method or algorithm providing a workspace orchestration service, according to exemplary embodiments.
Figure 8:
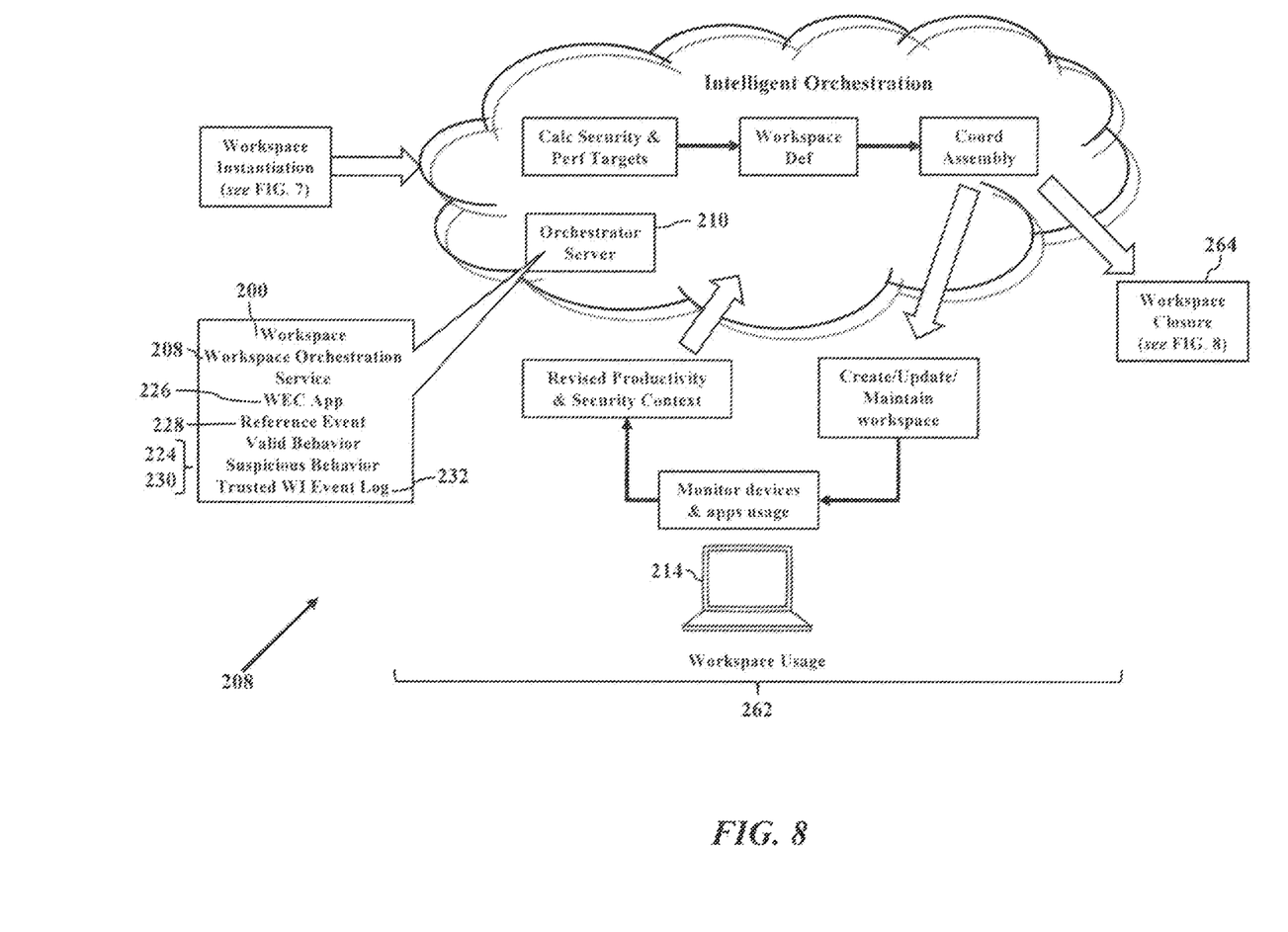
Figure 9:
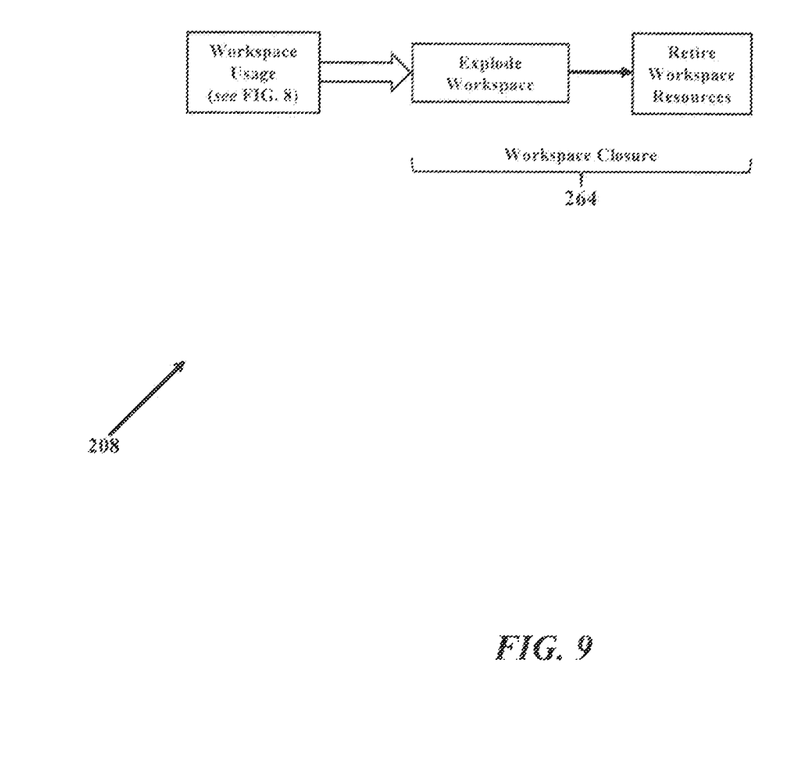

FIGS. 7-9 illustrate a method or algorithm providing the workspace orchestration service 208, according to exemplary embodiments. The workspace orchestration service 208 has three (3) basic phases (instantiate, orchestrate, and terminate) that secure the dynamic workspace 200 in an enterprise productivity ecosystem. FIGS. 7-9, though, only illustrate basic details, features, and concepts of the workspace orchestration service 208. The workspace orchestration service 208 is more thoroughly explained by U.S. patent application Ser. No. 16/670,658 filed Oct. 31, 2019, since published as U.S. Patent Application Publication 2021/0133298, and incorporated herein by reference in its entirety.

FIG. 7, for example, illustrates the workspace initialization phase 260. During the workspace initialization phase 260, a user operates the endpoint computer 214 within any physical environment (such as any type of environment and its associated context, including physical location, geographic location, location within a particular facility or building, detected networks, time of day, proximity of the user, individuals in the vicinity of the endpoint computer 214). An input action by the user is received via a launch point (such as accessing a web portal, a portal application, or a workspace). The launch point provides visibility to any resource (such as the electronic data 202 and software applications 206, illustrated in FIGS. 2-3). The workspace event comparator software application 226 and the workspace event logging software application 221 (as explained with reference to FIGS. 2-6) cooperate to provide access to the managed resources via the workspace orchestration service 208. In response to the user's input action or request, the workspace event logging software application 221 instructs or causes the endpoint computer 214 to collect initial security and productivity context information. The security context information may include attributes indicating a security risk associated with: the data and/or application being requested, a level of risk presented by the user, the hardware utilized by the endpoint computer 214, the logical environment of endpoint computer 214 in which the workspace 200 will be deployed to provide access to the requested data and/or application, and the physical environment in which the endpoint computer 214 is currently located.

The security context may be an abstract name or score representing the measurement of some security posture of the workspace 200. The security risk may be a score or index for measuring this context. The productivity context may be an abstract name, score, or measurement of real-time productivity of the workspace 200. The productivity score is an index for measuring the productivity context. The security target may be an abstract name, score, or measurement for the attack surface of the workspace definition. The productivity target may be an abstract name, score, or measurement for the productivity characteristics of the workspace definition. The initial productivity and security targets for the workspace 200 may be calculated based on the purpose 250 of the user's actions, perhaps combined with the productivity and security context 252 in which the workspace will operate. The productivity and security targets may also be based on behavioral analytics, telemetry and/or environmental information (collected via sensors).

FIG. 8 illustrates the workspace orchestration phase 262. When the workspace initialization phase 260 completes, the workspace orchestration service 208 may enter or initiate the workspace orchestration phase 262. Exemplary embodiments may calculate security and productivity targets, perhaps based upon the collected security and productivity context. In other cases, remote workspace orchestration service 208 may calculate security and productivity targets. The workspace orchestration service 208 generates the workspace definition (such as represented by the WDF 218 illustrated in FIGS. 2-3). The workspace definition generally refers to a collection of attributes that describe aspects of the workspace 200 that may be assembled, created, and deployed in a manner that satisfies a security target and a productivity target, perhaps in light of the security context and the productivity context in which the workspace 200 is to be deployed. The workspace definition may enable fluidity of migration of the instantiated workspace 200, since the workspace definition file 218 may support the ability for the workspace 200 to be assembled and configured for operation with the workspace orchestration service 208. The workspace orchestration service 208 coordinates an assembly of the workspace 200 and sends/provides the workspace 200 to the endpoint computer 214.

Exemplary embodiments may monitor usage within the workspace 200. As the user interacts with the endpoint computer 214 within the workspace 200, exemplary embodiments may monitor the workspace 200 and usage (inputs, selections, configurations) and re-evaluate the productivity and security contexts. Any revisions to the productivity and security contexts may be received by the workspace orchestration service 208 as feedback inputs that may revise/modify the workspace definition. This feedback workspace loop may continue until the user's input indicates a termination or end of the workspace 200.

The workspace orchestration phase 262 may further the workspace events 223. As FIG. 8 illustrates, the orchestration server 210 may receive the trusted workspace instantiation event log 232 and inspect/analyze its entries. The orchestration server 210 compares the entries in the trusted workspace instantiation event log 232 to the baseline or reference events 228 (as this disclosure above explains). The orchestration server 210 may thus inspect the trusted workspace instantiation event log 232 to identify the valid behavior 224 and to proceed with the current workspace instantiation and/or orchestration. Should, however, the orchestration server 210 discover the suspicious behavior 230 (based on the trusted workspace instantiation event log 232), then the orchestration server 210 may impose security precautions (such as nearly immediately entering, or proceeding to, the workspace termination phase 264 and/or communicatively severing the endpoint computer 214).

FIG. 9 illustrates the workspace termination phase 264. As the user interacts with the endpoint computer 214 within the workspace 200, exemplary embodiments may monitor the workspace 200, workspace usage (inputs, selections, configurations), and the trusted workspace instantiation event log 232 to receive or to infer an input to close or terminate the workspace 200. The user, for example, may close a software application or web browser. The workspace termination phase 264 may be automatically entered in response to the suspicious behavior 230 (and perhaps the isolation command 240 and/or isolation state 242, as explained with reference to FIG. 4). The workspace termination phase 264 breaks down and retires the resources representing the workspace 200. The resources are this made available for other tasks.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for detecting suspicious computer behavior, the method comprising:
   collecting, by each one of a plurality of client endpoint computers, security context information for the associated client endpoint computer;
   providing, by each one of the client endpoint computers, the security context information to an information handling system;
   generating, by the information handling system, a plurality of workspaces, each workspace being associated with a particular one of the client endpoint computers based on the associated client endpoint computer's associated security context information;
   receiving a first workspace instantiation event log from a first one of the client endpoint computers, the first workspace instantiation event log describing historical workspace events associated with a first one of the workspaces associated with the first client endpoint computer, wherein the historical workspace events include a record of workspace instantiations attempted for the first workspace;
   inferring the suspicious computer behavior based on the first workspace instantiation event log; and
   in response to the inferring of the suspicious computer behavior, terminating a first workspace instantiation associated with the first workspace.

2. The method of claim 1, further comprising communicatively isolating the first client endpoint computer in further response to inferring of the suspicious computer behavior.

3. The method of claim 1, further comprising sending an isolation command to the first client endpoint computer in further response to inferring of the suspicious computer behavior.

4. The method of claim 1, further comprising:
   receiving a second workspace instantiation event log from a second one of the client endpoint computers, the second workspace instantiation event log describing historical workspace events associated with a second one of the workspaces associated with the second client endpoint computer; and
   inferring a valid computer behavior based on the second workspace instantiation event log.

5. The method of claim 4, wherein in response to the inferring of the valid computer behavior, further comprising orchestrating a second workspace instantiation associated with the second workspace.

6. The method of claim 1, further comprising generating a workspace definition file associated with the first workspace instantiation.

7. The method of claim 6, further comprising sending the workspace definition file to the first client endpoint computer.

8. An information handling system, comprising:
   a hardware processor; and
   a memory device storing instructions that when executed by the hardware processor perform operations, the operations including:
      collecting, by each one of a plurality of client endpoint computers, security context information for the associated client endpoint computer;
      providing, by each one of the client endpoint computers, the security context information to an information handling system;
      generating, by the information handling system, a plurality of workspace definition files, each workspace definition file being associated with a particular one of the client endpoint computers based on the associated client endpoint computer's associated security context information;
      sending the associated workspace definition file to each of the client endpoint computers;
      receiving a first workspace instantiation event log from a first one of the client endpoint computers, the first workspace instantiation event log describing historical workspace events associated with a first one of the workspace definition files associated with the first client endpoint, wherein the historical workspace events include a record of workspace instantiations attempted for the first workspace definition file;
   comparing the first workspace instantiation event log to a reference event;
   in response to at least a portion of the first workspace instantiation event log failing to match the reference event, inferring suspicious computer behavior on the first client endpoint; and
   in response to the inferring of the suspicious computer behavior, terminating a first workspace instantiation associated with the first workspace definition file.

9. The information handling system of claim 8, wherein the operations further include communicatively isolating the first client endpoint computer in further response to inferring of the suspicious computer behavior.

10. The information handling system of claim 8, wherein the operations further include sending an isolation command to the first client endpoint computer in further response to inferring of the suspicious computer behavior.

11. The information handling system of claim 8, wherein the operations further include:
   receiving a second workspace instantiation event log from a second one of the client endpoint computers, the second workspace instantiation event log describing historical workspace events associated with a second one of the workspaces associated with the second client endpoint computer; and
   inferring a valid computer behavior based on the second workspace instantiation event log.

12. The information handling system of claim 11, wherein in response to the inferring of the valid computer behavior, the operations further include orchestrating the second workspace instantiation.

13. The information handling system of claim 8, wherein the operations further include generating the workspace definition file associated with the first workspace instantiation.

14. A memory device storing instructions that when executed perform operations, the operations including:
- collecting, by each one of a plurality of client endpoint computers, security context information for the associated client endpoint computer;
- providing, by each one of the client endpoint computers, the security context information to an information handling system;
- generating, by the information handling system, a plurality of workspace definition files, each workspace definition file being associated with a particular one of the client endpoint computers based on the associated client endpoint computer's associated security context information;
- generating, by the information handling system, a plurality of workspace definition files, each workspace definition file associated with a particular one of the client endpoint computers and a particular one of a plurality of workspaces orchestrated by a workspace orchestration service based on the associated client endpoint computer's associated security context information;
- sending the associated workspace definition file to each one of the client endpoint computers;
- receiving a first workspace instantiation event log from a first one of the client endpoint computers, the first workspace instantiation event log describing historical workspace events associated with a first one of the workspace definition files sent to the first client endpoint, wherein the historical workspace events include a record of workspace instantiations attempted for the first workspace definition file; and
- if the first workspace instantiation event log fails to match a reference event, then terminating a first workspace associated with the first client endpoint.

15. The memory device of claim 14, wherein the operations further include communicatively isolating the first client endpoint computer.

16. The memory device of claim 14, wherein the operations further include sending an isolation command to the first client endpoint computer.

17. The memory device of claim 14, wherein the operations further include determining the first workspace instantiation event log matches the reference event.

18. The memory device of claim 17, wherein in response to the workspace instantiation event log matching the reference event, further:
- receiving a second workspace instantiation event log from a second one of the client endpoint computers, the second workspace instantiation event log describing historical workspace events associated with a second one of the workspace definition files sent to the second client endpoint; and
- if the first workspace instantiation event log matches the reference event, then inferring a valid computer behavior.

19. The memory device of claim 14, wherein the operations further include generating a workspace definition file associated with the first workspace instantiation.

20. The memory device of claim 19, wherein the operations further include sending the workspace definition file to the first client endpoint computer.

* * * * *